United States Patent [19]

Blum

[11] Patent Number: 4,963,777

[45] Date of Patent: Oct. 16, 1990

[54] SUBMERSIBLE ELECTROMOTOR WITH INTERNAL VOLTAGE SELECTOR SWITCH

[75] Inventor: Albert Blum, Lohmar, Fed. Rep. of Germany

[73] Assignee: ABS Pumpen AG, Scheiderhohe, Fed. Rep. of Germany

[21] Appl. No.: 403,882

[22] Filed: Sep. 7, 1989

[30] Foreign Application Priority Data

Jan. 27, 1989 [DE] Fed. Rep. of Germany ....... 3902326

[51] Int. Cl.$^5$ ............................ H02K 5/10; F04B 49/00
[52] U.S. Cl. .................................... 310/68 A; 310/71; 310/87; 310/89; 417/361
[58] Field of Search ............. 219/133, 134; 310/68 D, 310/165, 71; 322/62, 63

[56] References Cited

U.S. PATENT DOCUMENTS

| | | | |
|---|---|---|---|
| 3,231,767 | 1/1966 | Powell | 310/71 |
| 3,325,659 | 6/1967 | Douglas | 310/87 |
| 3,344,291 | 9/1967 | Pratt | 310/89 |
| 3,999,890 | 12/1976 | Niedermeyer | 417/361 |

Primary Examiner—Peter S. Wong
Assistant Examiner—D. L. Rebsch
Attorney, Agent, or Firm—Brooks & Kushman

[57] ABSTRACT

Electromotors used as submersible motors consist of a fluid-tight housing (2), a shaft (3) mounted therein, the connecting end of which is brought out on one side in a leakproof fashion from the housing (2), a rotor (8) seated on the shaft (3), and a stator (9) fixed relative to the housing (2). In order for the electromotor to be switched over without appreciable expense from one voltage to another voltage in a very simple and reliable way, even by unskilled persons, a voltage selector switch (23) is provided in the interior of the housing (2). To actuate the voltage selector switch (23), there is provided in the region of the voltage selector switch a detachable housing part which, in the detached state, clears a housing opening through which the actuating element of the voltage selector switch (23) is accessible.

10 Claims, 3 Drawing Sheets

SUBMERSIBLE ELECTROMOTOR WITH INTERNAL VOLTAGE SELECTOR SWITCH

The invention relates to an electromotor, especially a submersible motor, comprising a fluid-tight housing, a shaft mounted therein, the connecting end of which is brought out on one side in a leakproof fashion from the housing, a rotor seated on the shaft, and a stator fixed relative to the housing.

Electromotors of the type mentioned are set up by the manufacturer in such a way that they can be operated only at a certain voltage.

In certain districts, there are areas in which the electricity grids have different voltages. In such districts, it is necessary for the electromotors to be capable of being switched over from one voltage to the other, especially if they are seated on mobile units and are to be used at different locations. To this end, these electromotors have two windings, of which one is optionally connected or disconnected. For the purpose of switching over, there is provided in the interior of the motor housing a terminal board, on which certain bridges must be rearranged. Such tasks are extremely expensive, since the motor housing must be opened, and complicated switching operations must be carried out. In this process, it is necessary for these tasks to be carried out by trained and qualified staff, which, however, is often not available on site. Consequently, there is frequently faulty switching, which can lead to motor failures, or also to accidents.

It is therefore the object of the invention to create an electromotor, in which the switching over from one voltage to another can be undertaken without appreciable expense in a very simple and reliable way even by unskilled persons.

This object is achieved according to the invention in that a voltage selector switch is provided in the interior of the housing, preferably on the side facing away from the connecting end of the shaft, in that there is provided in the region of the voltage selector switch a detachable housing part which, in the detached state, clears a housing opening, and in that the actuating element of the voltage selector switch is accessible through the housing opening.

Thus, in order to switch over the motor from one voltage to the other, it is only necessary to remove the appropriate housing part, and to actuate the voltage selector switch, which is expediently accommodated in the vicinity of the cable connection, with an appropriate tool. Turning the tool or the actuating element to the right effects, for example, a setting to 230 volt, while turning to the left produces a setting to 460 volt. The directions of rotation are indicated outside on the housing by appropriate markings.

These operations can be carried out easily with few manipulations even by non-experts.

The detachable housing part can be constructed as an end cap on the face, which can be placed in a leakproof fashion onto the housing and fastened thereon.

To fasten the end cap, a bolt can be provided which is screwed in an axial arrangement with a threaded end into the bearing bracket of the shaft end, while the end of the bolt facing away from the bearing bracket is led through an opening of the end cap in a leakproof fashion, a fastening element bearing against the outer cap side being arranged on the end of the bolt projecting through the end cap.

It is expedient for the voltage selector switch to have a rotatable contact pin which can be actuated by a tool. Rotatable contact pins can be actuated in an especially simple way, without the necessity for a sizeable clearance in the region of the switch.

For example, the contact pin can have at its actuating end a square section, which can be turned with a simple square socket spanner, or also a cross slot for the application of a screwdriver.

In the housing wall or in the end cap on the face it is possible to provide in the region of the actuating end of the voltage selector switch a fitting bore which is provided with an internal thread and can be closed with a sealing screw. In this case, it is thus unnecessary for the entire end cap to be detached, but only the sealing screw needs to be screwed out. The actuating tool, for example is a square socket spanner or a screwdriver, can be introduced into the housing interior without difficulty through a relatively small fitting bore, if the fitting bore is arranged flush with the contact pin.

If no mechanical loads are exerted on the end cap, the latter can consist of relatively thin sheet steel. In this case, it is possible to provide as the fitting bore an inserted nut, into which the sealing screw can be screwed.

The invention is illustrated by way of example in the drawing, and described below in detail with reference to the drawing, in which.

Figure 1:
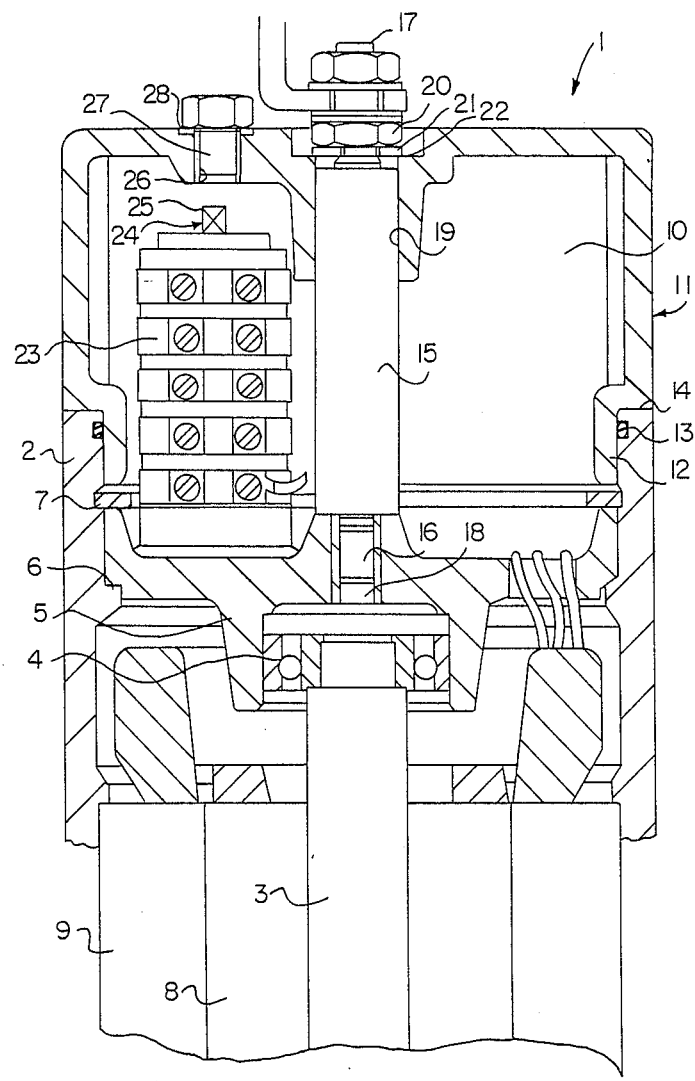
FIG. 1 shows a section through the end region of an electromotor.
Figure 1A:
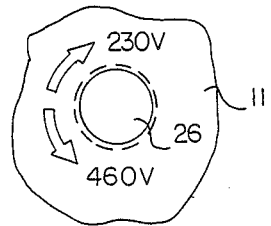

Represented in FIG. 1 of the drawing is a submersible motor 1, which is provided with a fluid-tight housing 2. Mounted in the interior of the housing is a shaft 3, the connecting end of which (not represented) is brought out below from the housing in the drawing. The shaft end facing away from the connecting end, which shaft end points upwards in the drawing, is seated in a bearing 4, which is mounted in a bearing bracket 5. The bearing bracket 5 is fixed in the interior of the housing 2 in that it bears on one side against a housing shoulder 6, while it is held on the other side by a snap ring 7 which is seated in a housing groove.

Seated on the shaft 3 is a rotor 8, and in the region around the rotor 8 there is provided a stator 9, which is fixed relative to the housing 2.

Connected to the housing bracket 5, which is constructed as a partition wall, on the side facing away from the shaft 3 (above in the drawing) is a receiving chamber 10, which is surrounded by a detachable end cap 11. The latter engages with an inwardly offset edge 12 into the open end of the housing 2, and is sealed off from the housing via a seal 13. The end cap 11 bears against the outer end face of the housing 2 with a shoulder 14.

The end cap 11 is held with the aid of a bolt 15, which is provided at both ends with threaded sections 16 or 17. The threaded section 16 pointing downwards in the drawing is screwed firmly into a centric threaded bore 18 of the bearing bracket 5. The end of the bolt 15 pointing upwards in the drawing reaches through a central cylindrical bore 19 provided in the end face of the end cap 11. The end cap 11 is held tightly and firmly on the motor housing 2 with the aid of a nut 20 screwed onto the upper threaded section 17 of the bolt 15 and of a washer 21 and a seal 22.

Provided in the receiving chamber 10 is a voltage selector switch 23, which is screwed onto the bearing bracket 5. The voltage selector switch is switched with the aid of an actuating pin 24, which is arranged parallel to the shaft 3 or to the bolt 15. The end of the actuating pin 24 protruding from the switch is provided with a square end 25.

Serving as access to the square end 25 is a threaded bore 26, which is constructed in the end face of the end cap 11, and is exactly flush with the actuating pin 24 or its square end 25. The threaded bore 26 is selected to be only so large that a square socket spanner just passes through.

The threaded bore 26 is closed tight with the aid of a screw 27 and a seal 28, which is situated between the outside of the cap and the underside of the screw head.

Through a cable bushing, which is not represented in more detail in the drawing and is known per se, the electrical leads are introduced into the receiving chamber 10 through the end cap 11, run firstly to the voltage selector switch 23, and then from there to the stator 9.

In order that the switching over from one voltage to another can also be undertaken safely by unskilled persons, the direction of rotation via which the appropriate setting can be achieved is indicated on the upper front face of the cap 11 in the region around the threaded bore 26. Turning the tool or the actuating pin 24 to the right always effects a setting to 230 volt, and turning to the left a setting to 460 volt. In this process, it is completely immaterial in which relative position the tool is applied. Since only two switching positions are possible, switching errors are practically excluded.

The illustrative embodiment represented in FIG. 2 once again shows a corresponding section of a motor, which is constructed in a manner similar to the illustrative embodiment according to FIG. 1, so that corresponding motor parts are provided with the same positional numbers.

Figure 2:
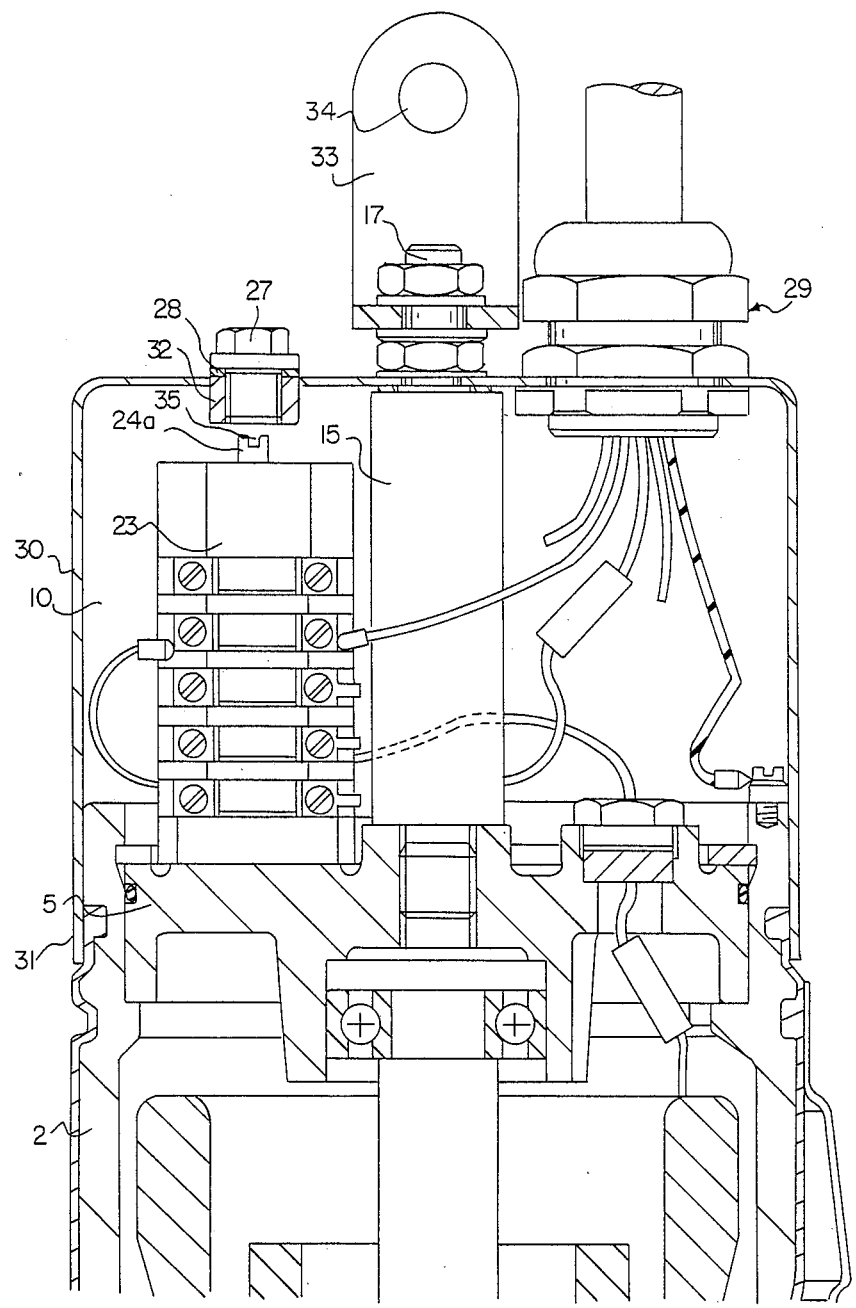
FIG. 2 shows a section through the end region of another electromotor.

The receiving chamber 10 adjacent to the bearing bracket 5 is surrounded in the illustrative embodiment represented in FIG. 2 by an end cap 30 of thin sheet, through which the connecting cable is introduced tightly into the receiving chamber 10 through a cable bushing 29. The end cap 30 is constructed like a beaker, and overreaches the housing 2 of a motor with its open end. Serving to seal the end cap 30 with respect to the outer wall of the housing 2 is an O-ring 31, which is inserted into an annular groove constructed in the outer surface of the motor housing 2.

The threaded bore, which serves as access for the actuating tool of the voltage selector switch 23, is constructed as a nut 32, which is inserted into a bore in the sheet of the end cap 30. In the same way as for the illustrative embodiment represented in FIG. 1, a screw 27 and a seal 28 serve as closure.

The mounting of the end cap 30 takes place in the same way as for the illustrative embodiment represented in FIG. 1 with the aid of a bolt 15 provided with threaded ends. An elbow 33, which has a bore 34 serving as a mounting eye, can be screwed onto the upper threaded end 17 of the bolt 15.

Deviating from the illustrative embodiment according to FIG. 1, the end of an actuating pin 24a can be provided with a cross slot 35, so that the voltage selector switch 23 can be actuated with the aid of a screwdriver.

Figure 3:
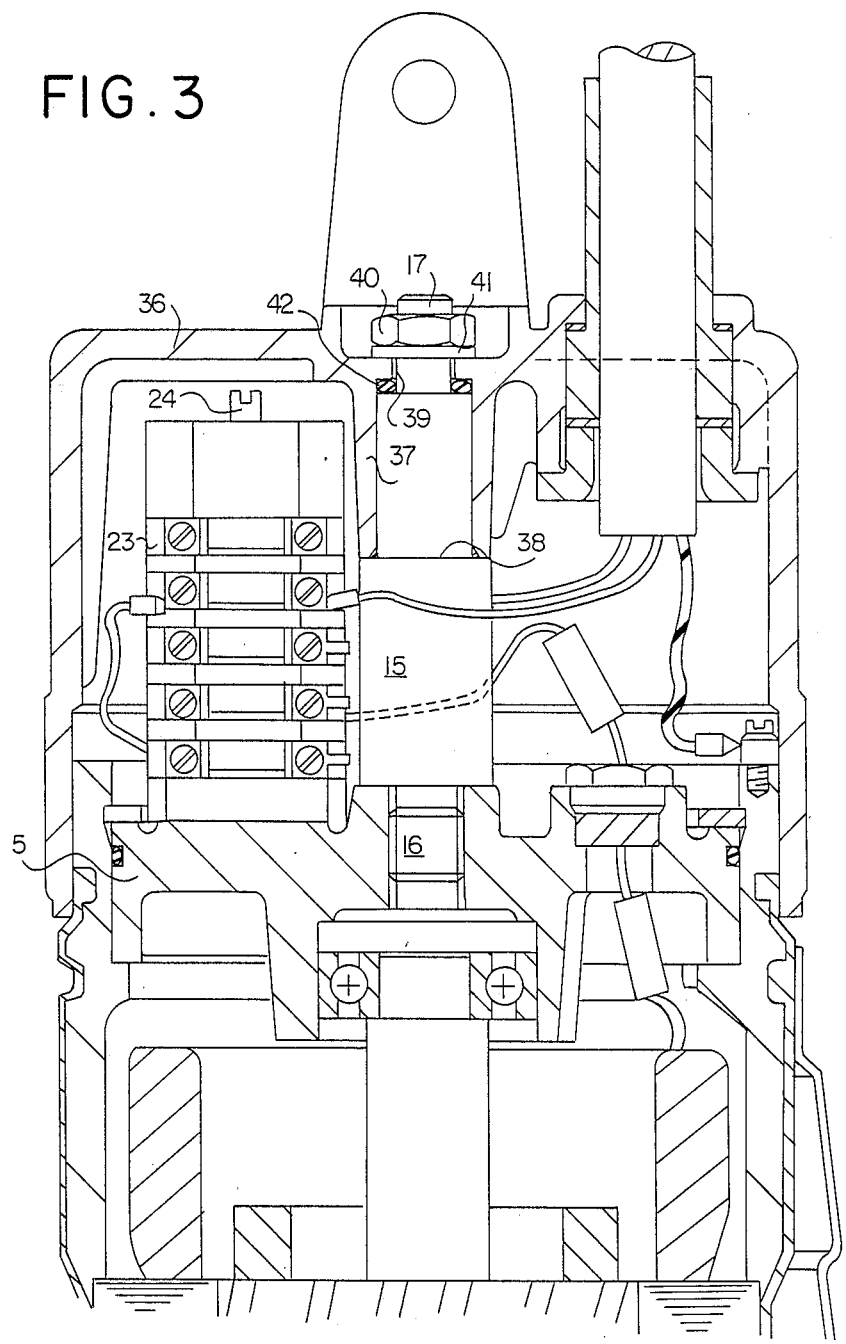
FIG. 3 shows a section through a further illustrative embodiment of an electromotor.

The illustrative embodiment represented in FIG. 3 shows an explosion-protected version of a submersible motor. In this illustrative embodiment, the end cap 36 has no closable bore as access to the voltage selector switch 23.

The end cap 36 consists of a stable casting; however, the construction is otherwise similar to that of the end cap 30 of the illustrative embodiment according to FIG. 2.

The end cap 36 is again held with the aid of a bolt 15, which is screwed with its lower threaded section 16 into the bearing bracket 5. The end cap 36 is supported with the aid of a central radial flange 37 on a shoulder 38 of the bolt 15. The upper threaded section 17 of the bolt 15 reaches through a reduced bore 39 of the cap, and is provided on its outer end with a nut 40 and with a lockwasher 41, which bear firmly against the outer front face of the end cap 36. To achieve a seal, there is situated behind the reduced bore 39 an O-ring 42 which, on its end facing away from the bore, bears against the upper end of the bolt 15.

In this illustrative embodiment, to actuate the voltage selector switch 23 it is necessary to slacken the upper nut 40, and detach the entire end cap 30. Actuation of the selector switch 23 takes place, again, by turning the actuating pin 24a, and to be precise, for example, by means of a screwdriver.

I claim:

1. A submersible three-phase motor having first and second operating voltages, the motor comprising a fluid-tight housing, a shaft mounted therein, the connecting end of which is brought out on one side in a leakproof fashion from the housing, a rotor seated on the shaft, and a stator fixed relative to the housing, characterized in that there is provided in the interior of the housing (2) a voltage selector switch (23) for changing between the first and second operating voltages, in that there is provided in the region of the voltage selector switch (23) a detachable housing part which, in the detached state, clears a housing opening, and in that the actuating element of the voltage selector switch (23) is accessible through the housing opening.

2. Electromotor according to claim 1, characterized in that the detachable housing part is constructed as an end cap (11; 30; 36) on the face, which is placed in a leakproof fashion onto the housing (2) and fastened thereon.

3. Electromotor according to claim 2, characterized in that to fasten the end cap (11; 30; 36), a bolt (15) is screwed in an axial arrangement with a threaded end (16) into the bearing bracket (5) of the shaft end, in that the end of the bolt (15) facing away from the bearing bracket (5) is led through an opening of the end cap (11; 30; 36) in a leakproof fashion, and in that a fastening element bearing against the outer cap side (11; 30; 36) is arranged on the end of the bolt (15) projecting through the end cap.

4. Electromotor according to claim 1, characterized in that the voltage selector switch (23) has a rotatable contact pin (24) which can be actuated with a tool.

5. Electromotor according to claim 4, characterized in that the contact pin (24) has a square end (25) at its actuating end.

6. Electromotor according to claim 4, characterized in that on its actuating end, the contact pin (24) has a cross slot (35) for the application of a screwdriver.

7. Electromotor according to claim 1, characterized in that in one of the housing wall (2) and the end cap (11; 30) on the face there is provided in the region of the actuating end of the voltage selector switch (23) a fitting bore (26) which is provided with an internal thread closed with a sealing screw (28).

8. Electromotor according to claim 7, characterized in that the fitting bore (26) is arranged in alignment with the contact pin (24).

9. Electromotor according to claim 2, characterized in that the end cap (30) consists of sheet steel.

10. Electromotor according to claim 9, characterized in that an inserted nut (32) is provided as the fitting bore.

* * * * *